United States Patent [19]

Bessho

[11] Patent Number: 4,978,219
[45] Date of Patent: Dec. 18, 1990

[54] SURFACE ROUGHNESS MEASURING APPARATUS UTILIZING DEFLECTABLE LASER BEAMS

[75] Inventor: Yoshinori Bessho, Mie, Japan
[73] Assignee: Brother Kogyo Kabushiki Kaisha, Aichi, Japan
[21] Appl. No.: 345,293
[22] Filed: May 1, 1989
[30] Foreign Application Priority Data May 6, 1988 [JP] Japan .................................. 63-110678
May 6, 1988 [JP] Japan .................................. 63-110679

[51] Int. Cl.$^5$ ............................................... G01B 9/02
[52] U.S. Cl. ..................................... 356/349; 356/359
[58] Field of Search ............................... 356/349, 359

[56] References Cited

U.S. PATENT DOCUMENTS 3,796,495 3/1974 Laub ..................................... 356/349
4,627,730 12/1986 Jungerman et al. ................ 356/349
4,741,620 5/1988 Wickramasinghe ................ 356/349

Primary Examiner—Davis L. Willis
Assistant Examiner—Matthew W. Koren
Attorney, Agent, or Firm—Oliff & Berridge

[57] ABSTRACT

An apparatus for optically measuring the roughness of a surface of a subject in a non-contacting manner, based on a heterodyne interference wherein a phase of a beat beam produced by a reference laser beam, and a measuring laser beam reflected by the surface of the subject and having a wavelength different from that of the reference laser beam is changed with a change in the length of an optical path of the measuring laser beam, which occurs due to a change in the surface roughness of the subject. The apparatus includes a laser source for producing the reference and measuring laser beams, a lens device having an object lens for converging the measuring laser beam on the subject surface, and a deflector for deflecting the measuring laser beam before the measuring laser beam is incident upon the subject surface, whereby the point of convergence of the measuring laser beam is moved on the subject surface in a direction parallel to the surface, while the subject is held stationary.

14 Claims, 7 Drawing Sheets

SURFACE ROUGHNESS MEASURING APPARATUS UTILIZING DEFLECTABLE LASER BEAMS

BACKGROUND OF THE INVENTION

1. Field of the Invention

The present invention relates generally to an apparatus for optically measuring the roughness of a surface, and more particularly to an optical surface roughness measuring apparatus which operates according to the heterodyne interference wherein a phase of a beat beam produced by a measuring laser beam and a reference laser beam changes with a change in the length of the optical path of the measuring laser beam, which occurs due to the roughness of the subject surface irradiated by the measuring laser beam.

2. Discussion of the Prior Art

As a surface roughness measuring apparatus, there is known an optical apparatus, in which the subject surface is irradiated by a laser beam, and the surface roughness is determined based on the frequency of the laser beam which changes due to the Doppler effect, as the surface roughness condition varies. Thus, the apparatus is capable of measuring the surface roughness without contacting the subject surface. For instance, the apparatus uses a laser source which produces two linearly polarized laser beams which have mutually perpendicular planes of polarization. These laser beams are split by a polarizing beam splitter or other suitable means, into a reference laser beam (having a frequency fr) which is incident upon a stationary mirror, and a measuring laser beam (having a frequency fm) which is incident upon a surface of a subject, perpendicularly to the subject surface. The subject is fixed on a suitable movable support member such as a rotary table or an X-Y table, so that the subject is moved to change the spot of the subject surface which is irradiated by the measuring laser beam. While the frequency fr of the reference laser beam reflected by the mirror is held constant, the frequency fm of the measuring laser beam reflected by the subject surface is changed according to the Dopper effect, as the surface roughness condition on the irradiated spot is changed with the movement of the subject, namely, as the spot irradiated by the measuring laser beam is displaced in the vertical direction. Therefore, the roughness of the subject surface may be determined based on the amount of change in the frequency fm of the measuring laser beam with respect to the frequency fr of the reference laser beam.

Thus, the known surface roughness measuring apparatus described above requires a movable support member for moving the subject, so that the irradiated spot is moved to measure the surface roughness. Further, the measurement of the surface roughness is influenced by undesirable movements of the subject itself, which arise from vibrations of a drive motor to move the support member, pitching and rolling movements and precession of the support member.

Further, the known apparatus suffers from a measuring error which is caused by two different optical paths along which the reference and measuring laser beams are propagated. Namely, the reference and measuring laser beams experience different optical characteristics of the optical systems which define the above-indicated two optical paths, and are subject to different influences by external conditions such as vibrations, and density and temperature of the surrounding atmospheres through which the two beams are propagated.

SUMMARY OF THE INVENTION

It is therefore an object of the present invention to provide an optical apparatus which is capable of optically measuring the roughness of a surface of a subject with improved accuracy, without moving the subject.

A second object of the invention is to provide such an optical surface roughness measuring apparatus wherein the reference and measuring laser beams are not subject to different optical characteristics, or are subject to the same influence by external conditions.

The first object may be achieved according to the principle of the present invention, which provides an optical surface roughness measuring apparatus for measuring the roughness of a surface of a subject in a non-contacting manner, based on a heterodyne interference wherein a phase of a beat beam produced by a reference laser beam, and a measuring laser beam reflected by the surface of the subject and having a wavelength different from that of the reference laser beam is changed as a length of an optical path of the measuring laser beam is changed with a change in the surface roughness of the subject, the apparatus including a laser source for producing the reference and measuring laser beams, a lens device having an object lens for converging the measuring laser beam on the subject surface, and a deflector for deflecting the measuring laser beam before the measuring laser beam is incident upon the subject surface, whereby the point of convergence of the measuring laser beam is moved on the subject surface in a direction parallel to the surface, while the subject is held stationary.

In the surface roughness measuring apparatus of the present invention constructed as described above, the measuring laser beam is deflected by the deflector to move the point of convergence of the measuring laser beam on the subject surface, rather than moving the subject relative to the fixed point of convergence of the measuring laser beam. With the deflection of the measuring laser beam, the length of the optical path of the measuring laser beam is changed with a change in the roughness of the subject surface, whereby the phase of the frequency of the beat beam which is produced by the measuring laser beam reflected from the subject surface and the reference laser beam reflected by a suitable reference surface varies with the surface roughness. The use of the deflector eliminates a conventionally used device for moving the subject relative to the fixed measuring laser beam, thereby simplifying the construction of the apparatus and lowering the cost of the apparatus. Further, the elimination of the movement of the subject per se eliminates the conventionally experienced measuring error which arises from the vibration, pitching and rolling movements and precession of the subject while the subject is moved.

The phase change or shift of the beat beam according to the heterodyne interference utilized in the present invention is identical in substance with the frequency change or shift according to the Doppler effect described above with respect to the conventional apparatus.

The deflector may be an acousto-optical deflector which has a diffraction grating whose refractive index changes with a frequency of a ultrasonic wave to which the diffraction grating is exposed.

In one form of the invention, the apparatus further comprises a mirror, and beam splitting means disposed between the deflector and the subject. The beam splitting means is further adapted to reflect the reference laser beam toward the mirror so that the reflected reference laser beam is reflected by the mirror.

In another form of the invention, the apparatus further comprises a mirror, and beam splitting means disposed between the laser source and the deflector. The beam splitting means is adapted to transmit the measuring laser beam so that the transmitted measuring laser beam is incident upon the deflector and the deflected measuring laser beam is incident upon the surface of the subject. The beam splitting means reflects the reference laser beam toward the mirror so that the reflected reference laser beam is reflected by the mirror. In this case, the detecting circuit requires suitable means for eliminating a frequency shift of the measuring laser beam which is given by the deflector, because only the measuring laser beam is subject to the frequency shift by the deflector.

In a further form of the invention, the apparatus further comprises beam splitting means disposed between the laser source and the deflector, a mirror, and another deflector disposed between the mirror and the beam splitting means. The beam splitting means transmits the measuring laser beam toward the deflector so that the transmitted measuring laser beam is deflected by the deflector and the deflected measuring laser beam is incident upon the surface of the subject. The beam slitting means reflects the reference laser beam toward the above-indicated another deflector so that the reflected reference laser beam is deflected by the another deflector and the deflected reference laser beam is incident upon the mirror.

The second object may be achieved according to a still further form of the invention, wherein the deflector is disposed between the laser source and the subject. The deflector is adapted to deflect only the measuring laser beam so that the deflected measuring laser beam is incident upon the surface of the subject. However, the deflector merely transmits the reference laser beam for incidence upon the surface of the subject such that a point of convergence of the incident reference laser beam on the surface of the subject is held fixed.

In this form of the invention, both the measuring laser beam and the reference laser beam are incident upon the surface of the subject. In other words, the reference laser beam experience the same optical characteristics, and the same external conditions such as vibrations, and density and temperature of the surrounding atmosphere, as experienced by the measuring laser beam. Thus, the instant apparatus does not suffer from a measuring error as encountered in the conventional apparatus, which uses a mirror, for example, for reflecting the reference laser beam.

The second object may also be achieved according to a yet further form of the invention, wherein the apparatus further comprises beam guiding means including beam splitting means for directing the reference laser beam upon the surface of the subject, without the reference laser beam passing through the deflector, so that a point of convergence of the incident reference laser beam on the surface of the subject is held fixed. The beam guiding means is further adapted to direct the measuring laser beam such that the measuring laser beam is deflected by the deflector and the deflected measuring laser beam is incident upon the surface of the subject so that the point of convergence of the incident measuring laser beam is moved with the deflection thereof by the deflector.

In this form of the invention, too, the reference laser beam as well as the measuring laser beam is incident upon and reflected by the surface of the subject, whereby the conventionally experienced measuring error due to the different optical characteristics and external conditions for the two beams is eliminated. Thus, the instant apparatus offers the same advantage as provided by the apparatus which uses the specially designed deflector which deflects only the measuring laser beam.

In the above form of the invention, the beam guiding means may further include reflector means for directing the measuring laser beam from the beam splitting means, for transmission through the deflector means such that the deflected measuring laser beams is incident upon the surface of the subject. In this instance, the beam splitting means may comprise a beam splitter which reflects the reference laser beam for incidence upon the surface of the subject, and which transmits the reference laser beam reflected from the surface of the subject, for transmission through the deflector. The beam splitter is adapted to transmit the measuring laser beam for reflection by the reflector means so that the reflected measuring laser beam is transmitted through the deflector. A ¼ waveplate may be provided between the beam splitter and the subject, for permitting the reference laser beam reflected by the surface of the subject to be transmitted through the beam splitter, for transmission through the deflector. The ¼ waveplate permits the deflected measuring laser bean reflected by the surface to be reflected by the beam splitter so that the reflected measuring laser beam is not transmitted again through the deflector.

BRIEF DESCRIPTION OF THE DRAWINGS

The above and other objects, features and advantages of the present invention will become more apparent by reading the following detailed description of presently preferred embodiments of the invention, when considered in connection with the accompanying drawings, in which.

DETAILED DESCRIPTION OF THE PREFERRED EMBODIMENTS

Figure 1:
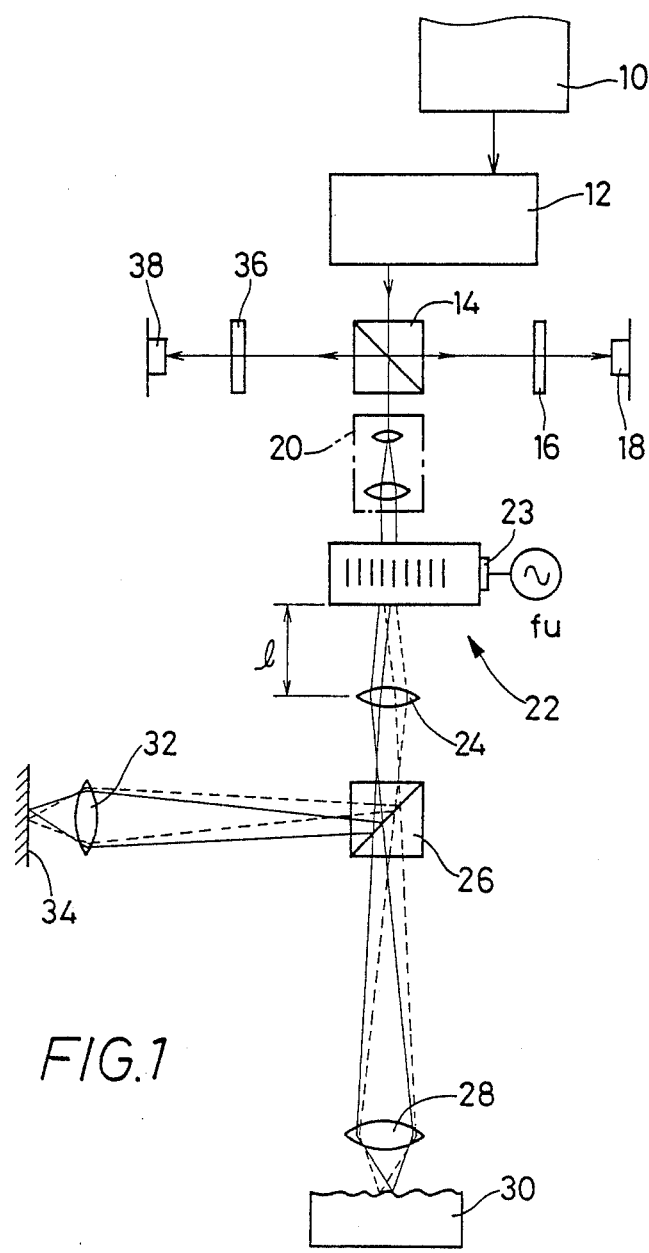
FIG. 1 is a schematic view showing an optical system of a surface roughness measuring apparatus of a laser scanning type constructed according to one embodiment of the present invention.

Referring first to FIG. 1, reference numeral 10 denotes a laser source which produces a laser radiation, which is incident upon a frequency shifter 12. The frequency shifter 12 converts the incident laser radiation into two beat beams in the form of two linearly polarized laser beams which have mutually perpendicular planes of polarization and different frequencies. For instance, the two beat beams or linearly polarized beams consist of an S-type linearly polarized beam having a frequency fs, and a P-type linearly polarized beam having a frequency fp. The frequencies fs and fp are determined so that the frequency of a beat beam of the S-type and P-type linearly polarized beams, which is referred to as "reference beat frequency" fB (=fs−fp), is about 100kHz. This beat beam is split by a non-polarizing beam splitter 14, into two beams one of which is reflected by the splitter 14 and the other of which is transmitted therethrough. The reflected beam is transmitted through a polarizer 16 and received by a reference photosensor 18. This reference photosensor 18 produces a reference beat signal KBS having a frequency of about 100kHz, which represents the reference beat frequency fB.

The beat beam transmitted through the non-polarizing beam splitter 14 is incident upon a beam expander 20, so that the diameter of the incident beam is enlarged to about 3mm, for example. The beam emitted from the beam expander 20 is incident upon an acousto-optical deflector 22 which includes a substrate formed of a single crystal of tellurium dioxide or molybdate, or a glass material, and a piezoelectric element 23 attached to one end face of the substrate. The piezoelectric element 23 which produces an acoustic wave having a frequency fu, so as to form a diffraction grating on the substrate, so that the refractive index of the substrate is periodically changed in response to the change in the frequency fu, whereby the beat beam which is transmitted through the substrate of the acousto-optical deflector 22 is deflected by an angle $\theta$ with respect to an optical axis, according to the change in the frequency fu. The ends of the angular range of deflection of the beam by the acousto-optical deflector 22 are indicated by solid and broken lines in FIG. 1. For instance, the frequency fu is changed from a center value of about 60MHz, on both sides of the center value.

The beat beam thus diffracted by the acousto-optical deflector 22 is incident upon a relay lens 24 which is spaced a distance l from the output surface of the deflector 22. The relay lens 24 has a focal length equal to the distance l, so that the angle of deflection of the beam beam by the deflector 22 is converted into a variation $1 \times \theta$ in the position of the deflected beam at the relay lens 24. The beat beam transmitted through the relay lens 24 is incident upon a polarizing beam splitter 26, and thereby split into the S-type and P-type linearly polarized beams. The P-type linearly polarized beam whose polarization plane is parallel to the incidence plane of the beam splitter 26 is transmitted through the beam splitter 26. The transmitted P-type linearly polarized beam is converged by an object lens 28, on the surface of a subject 30 whose roughness is measured by the instant measuring apparatus. This P-type linearly polarized beam serves as a measuring laser beam.

On the other hand, the S-type linearly polarized beam whose polarization plane is perpendicular to the incidence plane of the beam splitter 26 is reflected by this beam splitter 26, in a direction substantially perpendicular to the optical axis between the frequency shifter 22 and the beam splitter 26. The reflected beam, which is used as a reference laser beam, is converged by an object lens 32, on a mirror 34. The surface of the mirror 34 is perpendicular to the optical path between the mirror 34 and the beam splitter 26, so that the length of the optical path along which the S-type linearly polarized beam reflected by the mirror 34 is propagated is not changed with a change in the point of convergence of that beam on the surface of the mirror 34, as a result of deflection of the beat beam by the acousto-optical deflector 22.

The subject 30 is held in a predetermined position, while the point of convergence of the P-type linearly polarized beam on the surface of the subject 30 is changed as a result of deflection of the beat beam by the acousto-optical deflector 22. It will be understood that the relay lens 24 and the object lens 28 cooperate to constitute a lens device for converging the P-type linearly polarized beam on the surface of the subject 30.

The P-type and S-type linearly polarized laser beams which are reflected by the surface of the subject 30 and the mirror 34 are propagated back to the non-polarizing beam splitter 14, in the reverse direction along the same optical paths as described above. The laser beams incident upon the beam splitter 14 are reflected by the beam splitter 14, and received by a measuring photosensor 38 via a polarizer 36. The measuring photosensor 38 produces a measuring beat signal BS which has a beat frequency fD equal to a difference between the frequencies of the P-type and S-type linearly polarized laser beams reflected by the subject and mirror 30, 34.

As indicated above, the length of the optical path along which the S-type linearly polarized beam reflected by the mirror 34 is propagated to the measuring photosensor 38 is held constant. On the other hand, the length of the optical path along which the P-type linearly polarized beam reflected by the subject 30 is propagated to the photosensor 38 varies, upon deflection of the beam by the deflector 22, due to the roughness of the surface of the subject 30, that is, due to a displacement of the point of convergence of the P-type linearly polarized beam, in the direction perpendicular to the surface of the subject 30. Where the amount of displacement of the convergence point of the P-type beam is represented by $\Delta Z$, the length of the path of the P-type beam varies by an amount $2 \Delta Z$. As a result, the phase of the measuring beat beam BS incident upon the measuring photosensor 38 is changed, due to the heterodyne interference, by an amount $\Delta\phi$ with respect to the phase of the reference laser beam, i.e., S-type linearly polarized beam reflected by the mirror 34 and incident upon the photosensor 38, as indicated by the following equation (1):

$$\Delta\phi = (2\pi/\lambda) \, 2\Delta Z \qquad (1)$$

Where the phase shift amount $\Delta\phi$ per unit time is greater than $2\pi$, namely, where a rate of change $\Delta Z/\Delta t$ in the displacement amount $\Delta Z$ (representative of the surface roughness of the subject 30) is greater than a half ($\lambda/2$) of the wavelength $\lambda$ of the P-type linearly polarized laser beam, the measuring beat frequency fD of the measuring beat beam (P-type linearly polarized beam) is changed by an amount $(2/\lambda)\cdot(\Delta Z/\Delta t)$, with respect to the reference beat frequency fB of the reference beat beam (S-type linearly polarized beam). The measuring beat frequency fD is represented by the following equation (2):

$$fD = -(2/\lambda)\cdot(\Delta Z/\Delta t) + fB \qquad (2)$$

The above amount $(2/\lambda)\cdot(\Delta Z/\Delta t)$ of the measuring beat frequency fD corresponds to a frequency shift due to the Doppler effect indicated above. Although the P-type and S-type linearly polarized beams reflected by the subject 30 and mirror 34, i.e., the measuring and reference laser beams are subject to a frequency shift while the beams are transmitted through the acousto-optical deflector 22, the measuring beat frequency fD will not be influenced by this frequency shift, since the frequencies of the two beams are shifted by the same amount of 2fu. It is noted that the wavelength $\lambda$ used in the equations (1) and (2) is the wavelength of the P-type linearly polarized beam which has been transmitted through the deflector 22, toward the polarizing beam splitter 26.

The polarizers 16 and 36 have optical axes which are inclined at an angle of about 45° with respect to the polarization planes of the P-type and S-type linearly polarized beams. By adjusting the inclination angles of the optical axes of the polarizers 16, 36, the relative intensities of the P-type and S-type linearly polarized beams incident upon the reference and measuring photosensors 18, 38 may be adjusted.

Figure 2:
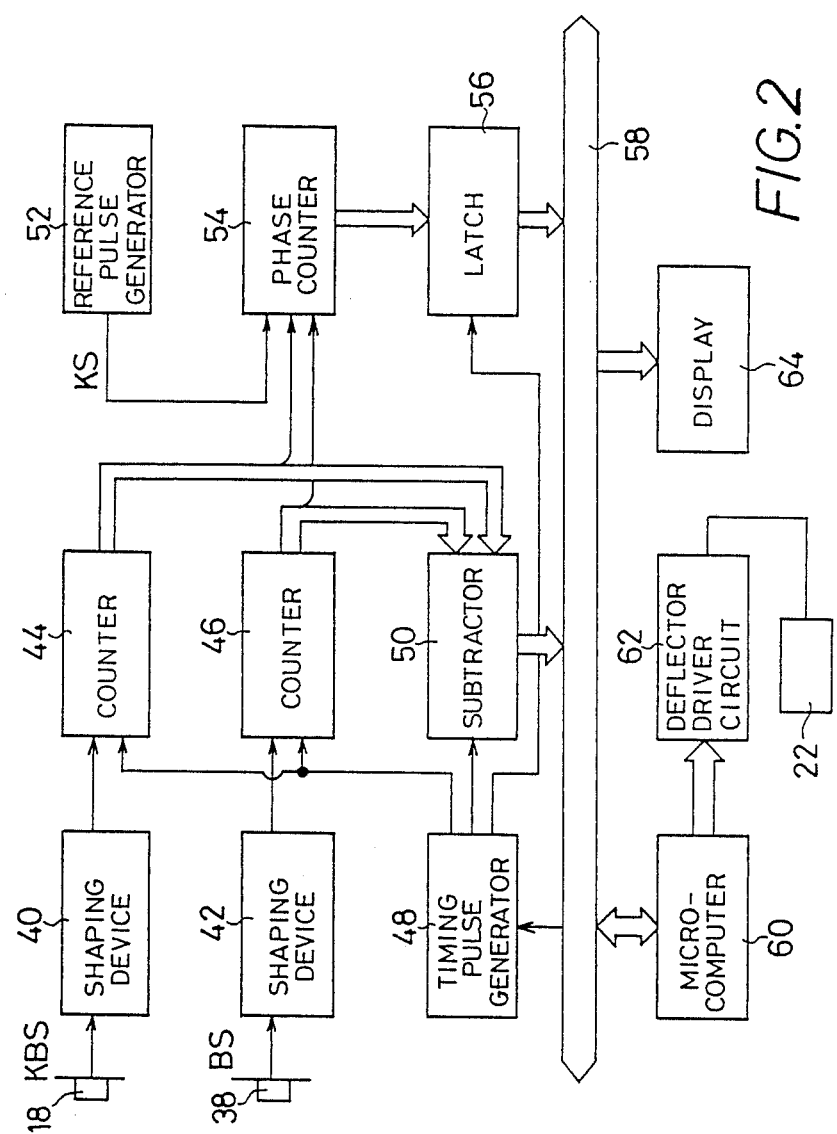
FIG. 2 is a schematic block diagram of a detecting circuit of the measuring apparatus of FIG. 1.

The instant surface roughness measuring apparatus of the laser scanning type incorporates a detecting circuit as indicated in the schematic block diagram of FIG. 2. The reference beat signal KBS and the measuring beat signal BS which are produced by the reference and measuring photosensors 18, 38 are first applied to respective shaping devices 40, 42, which amplify the received signals and shape them into pulses having a rectangular waveform. The thus amplified and shaped reference and measuring beat signals KBS, BS are applied to respective counters 44, 46, which count these signals according to timing pulses generated by a timing pulse generator 48. Counts Cb and Cd of the counter 44, 46 are applied to a subtractor 50, which obtains a difference (Cb−Cd). The obtained difference is temporarily held in the subtrator 50.

A reference pulse generator 52 produces reference pulses KS having a predetermined clock frequency. The reference pulses KS are applied to a phase counter 54, and counted by the phase counter 54 for a given counting period equivalent to a difference between count timings of the counters 44, 46. For example, the counting period is equal to a period between the moments at which the counters 44, 46 start counting. A count Ci of the phase counter 54 corresponds a phase difference between the measuring and reference beat signals BS, KBS. The count Ci is temporarily latched in a latch 56. Where the frequency of the reference pulses KS is about 100MHz, for example, 1000 reference pulses KS represent 2 $\pi$ when the reference beat frequency (fs−fp) of the reference beat signal KBS is 100kHz.

The difference (Cb−Cd) and the count Ci which are temporarily stored in the subtractor 50 and latch 56 are fed to a microcomputer 60 through a data bus line 58, according to the timing pulses generated by the timing pulse generator 48. The microcomputer 60 includes a central processing unit (CPU), a random-access memory (RAM) and a read-only memory (ROM). The CPU operates according to a control program stored in the ROM, while utilizing the temporary data storage function of the RAM, and produce an output signal indicative of the surface roughness of the subject 30, based on the received values (Cb−Cd) and Ci. The CPU further produces an output signal for controlling a deflector driver circuit 62, such that the frequency fu of the signal applied to the piezoelectric element 23 of the deflector 22 is continuously changed, to deflect the P-type linearly polarized laser beam incident upon the surface of the subject 30, so that the irradiation point on the subject surface is moved between two points.

The difference (Cb−Cd) indicated above corresponds to an integer "N" which appears in the following equation (3), where the phase difference between the reference and measuring beat signals KBS and BS is greater than 2 $\pi$. In this case, a displacement amount Z1 (amount of roughness) of the surface of the subject 30 is obtained in increments of $\lambda/2$, as indicated by the following equation (4), since the displacement amount $\Delta$Z of the subject surface is equal to $\lambda/2$ according to the equation (1) where the phase difference $\Delta$100 is equal to 2 $\pi$.

$$\Delta\phi = 2N\pi + x \quad (3)$$

$$\begin{aligned} Z1 &= (\lambda/2) \cdot N \\ &= (\lambda/2) \cdot (Cb - Cd) \end{aligned} \quad (4)$$

On the other hand, a displacement Z2 of the surface of the subject 30, which is smaller than $\lambda/2$, is obtained based on the count Ci, in increments of $\lambda/2000$, as indicated by the following equation (5):

$$\begin{aligned} Z2 &= (\lambda/4\pi) \cdot x \\ &= (\lambda/4\pi) \cdot (2\pi Ci/1000) \end{aligned} \quad (5)$$

The above equation (5) is obtained based on the equation (1). A value "x" in the equations (3) and (5) represents a fraction of the phase difference $\Delta\phi$, which is smaller than $2\pi$, and is expressed by $(2\pi Ci/1000)$.

The roughness of the surface of the subject 30 is expressed by a sum of the thus obtained displacements Z1 and Z2, and is indicated on a display 64. In the case where the phase difference $\Delta\phi$ is smaller than $2\pi$, i.e., where the displacement amount $\Delta$Z is smaller than $\lambda/2$, the difference (Cb−Cd) or the integer "N" is zero, and the surface roughness is expressed by the displacement Z2 expressed by the equation (5).

In the present surface roughness measuring apparatus, the point of irradiation of the surface of the subject 30 with the laser beam is moved by deflecting the laser beam by the acousto-optical deflector 22, rather than moving the subject 30 per se relative to the fixed laser beam. Accordingly, the measuring apparatus does not require a device for moving the subject 30, and is accordingly simplified in construction and available at a reduced cost. Since the subject 30 is not moved, the measurement of the surface roughness is not affected by the accuracy with which the subject 30 is moved straight exactly in the direction perpendicular to the optical path of the laser beam. Namely, the instant measuring apparatus does not suffer from a conventionally experienced error which arises from a more or less non-linear movement of the subject 30 and vibrations of the moving subject 30.

Other embodiments of the present invention will be described. In these embodiments, the same reference numerals as used in the above embodiment will be used to identify the functionally corresponding elements, and redundant description of these elements will be omitted in the interest of brevity and simplification.

Figure 3:
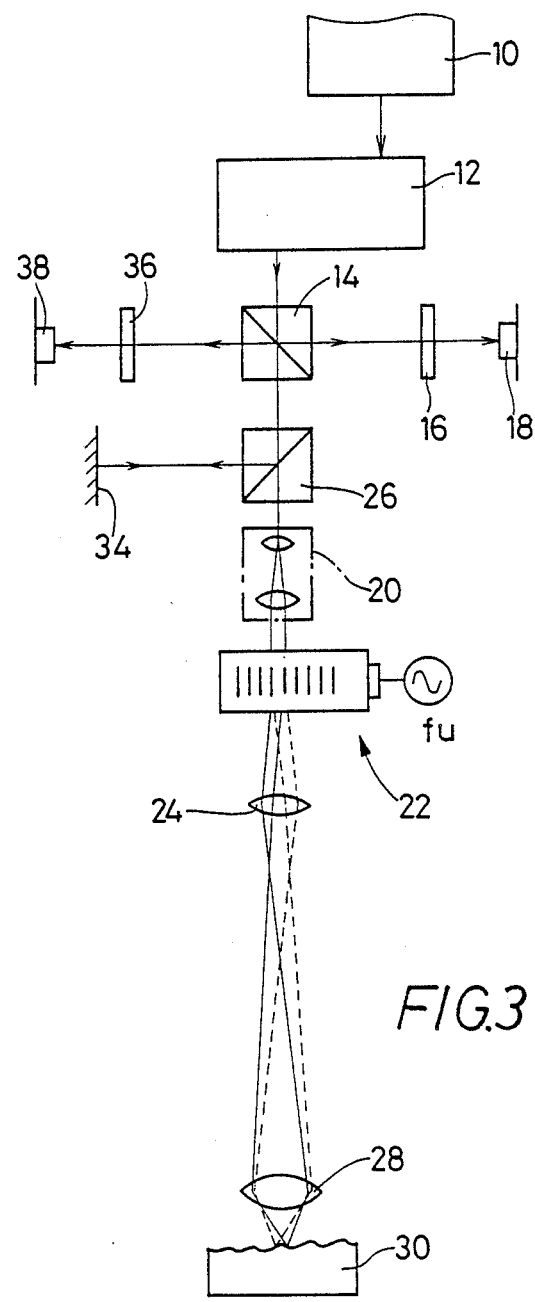
FIG. 3 is a schematic view of an optical system of another embodiment of the measuring apparatus of the invention.
Figure 4:
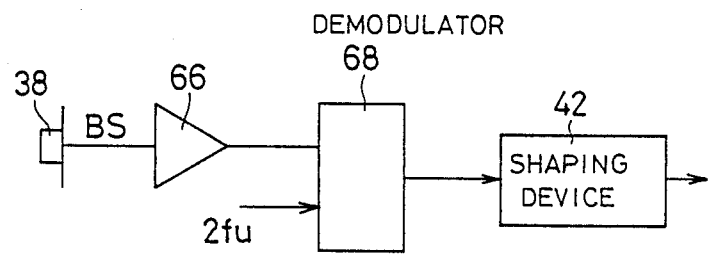
FIG. 4 is a schematic block diagram showing a part of a detecting circuit of the measuring apparatus of FIG. 3.

In the measuring apparatus shown in FIG. 3, the polarizing beam splitter 26 for splitting the laser beam into the reference laser beam (S-type linearly polarized beam) and the measuring laser beam (P-type linearly polarized beam) is disposed between the non-polarizing beam splitter 14 and the beam expander 20, unlike the polarizing beam splitter 26 in the first embodiment. In the present modified embodiment, only the P-type linearly polarized beam is subject to the frequency shift by fu two times by the acousto-optical deflector 22. In this case, the frequency shift of 2fu of the P-type linearly polarized beam by the deflector 22 must be eliminated by suitably processing the measuring beat signal BS produced by the measuring photosensor 38. For instance, an amplifier 66 and a demodulator 68 are provided between the photosensor 38 and the shaping device 42, as illustrated in FIG. 4, so that the frequency shift 2fu is eliminated from the signal BS by the demodulator 68, after the signal BS is amplified by the amplifier 66.

Figure 5:
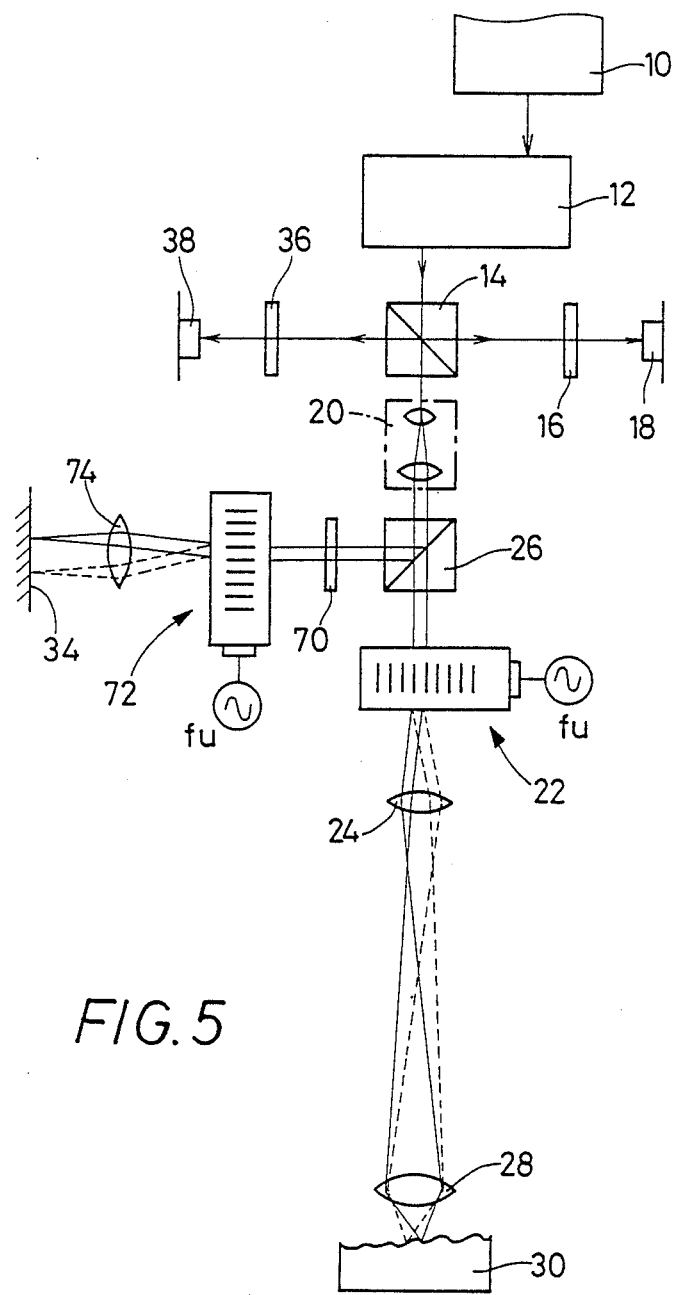
FIG. 5 is a schematic view of a further embodiment of the invention.

Referring next to FIG. 5, there is shown a further embodiment of the invention, in which the polarizing beam splitter 26 is disposed between the beam expander 20 and the acousto-optical deflector 22, while a ¼ waveplate 70, an acousto-optical deflector 72 and an object lens 74 are provided between the beam splitter 26 and the mirror 34, so that the S-type linearly polarized reference laser beam reflected by the beam splitter 26 is transmitted through the ¼ waveplate, deflected by the deflector 72, and converged by the object lens 74, on the surface of the mirror 34. The second acousto-optical deflector 72 is operated at the same ultrasonic wave frequency fu as that of the deflector 22, whereby the reference laser beam and the measuring laser beam are subject to the same amount of the frequency shift by the respective deflectors 72, 22. This embodiment therefore eliminates signal processing means as indicated in FIG. 4, and can be operated with the same detecting circuit as shown in FIG. 2.

Figure 6:
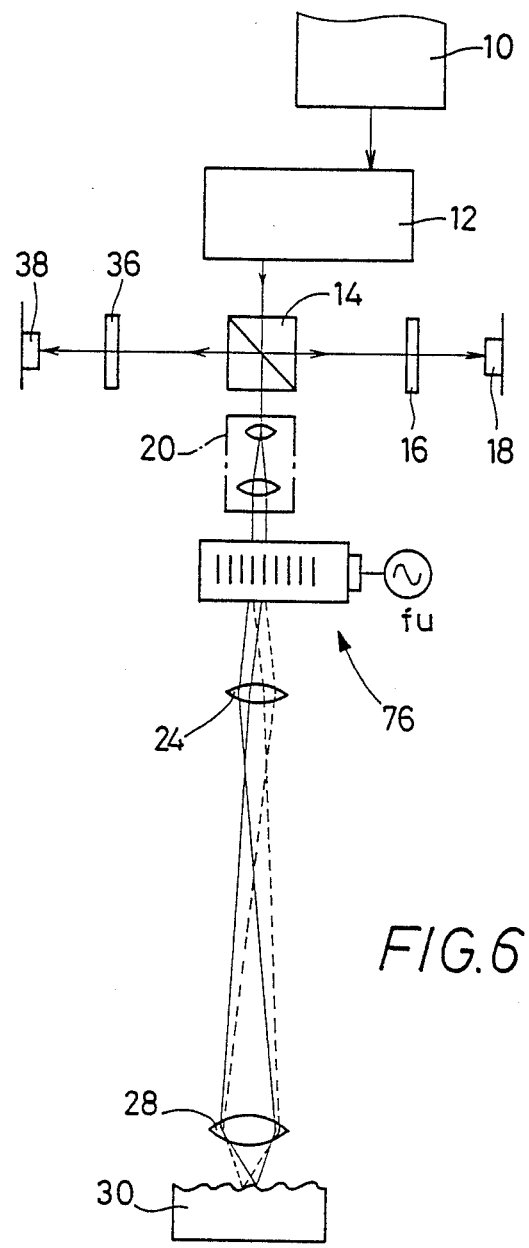
FIG. 6 is a schematic view of a still further embodiment of the invention.

A further embodiment shown in FIG. 6 uses a specially designed acousto-optical deflector 76, in place of the acousto-optical deflector 22. This deflector 76 is adapted to deflect only the P-type linearly polarized beam, and permit the S-type linearly polarized beam to pass straightforward. Accordingly, the point of convergence of the P-type beam as the measuring laser beam is moved on the surface of the subject 30, while the point of convergence of the S-type beam as the reference laser beam is fixed on the subject surface. Thus, the length of the optical path of the S-type beam to and from the stationary subject 30 is held constant, while the length of the optical path of the P-type beam is changed according to the roughness condition of the subject surface. This embodiment operates in the same manner as the first embodiment, except that the reference and measuring laser beams are propagated through the same optical system, and are not subject to an influence due to different optical characteristics, or are subject to the same influence by external conditions such as vibrations, and density and temperature of the surrounding atmospheres.

Figure 7:
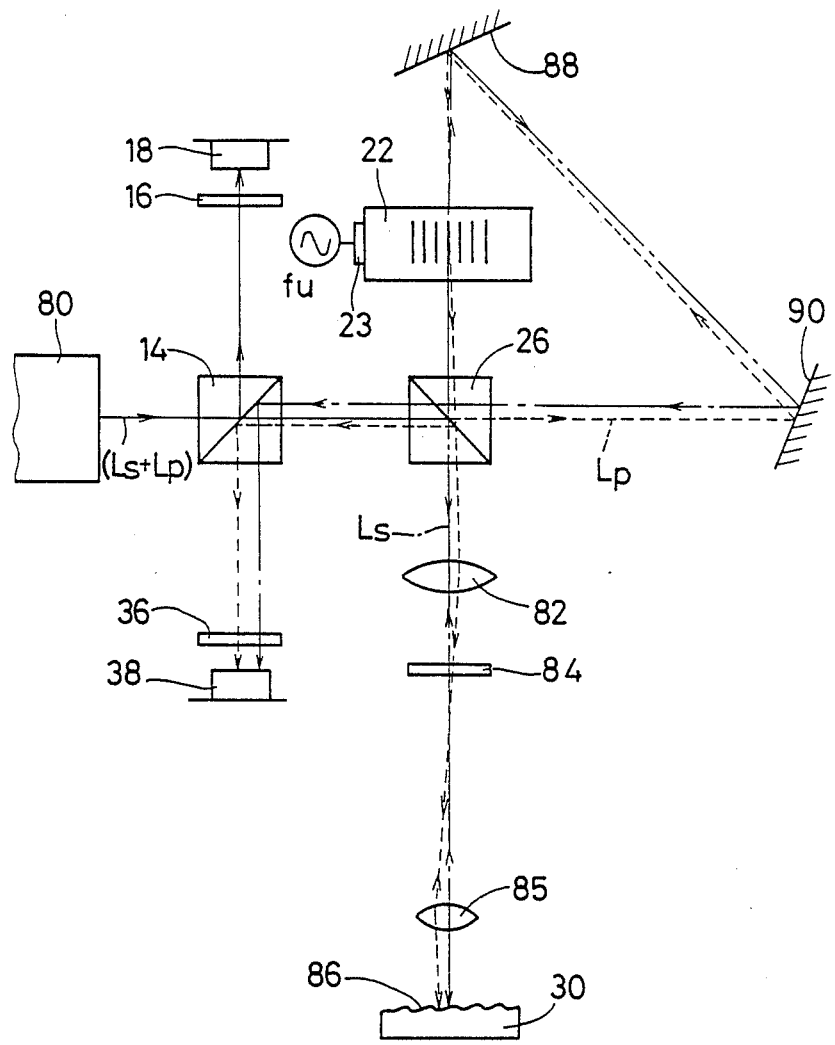
FIG. 7 is a schematic view showing a yet further embodiment of the invention.

Referring next to FIG. 7, there is illustrated a still further embodiment of the invention, wherein reference numeral 80 denotes a Zeeman type He-Ne laser source which produces S-type and P-type linearly polarized laser beams Ls and Lp which have mutually perpendicular polarization planes and respective frequencies fs and fp. The present measuring device using the laser source 80 does not require a frequency shifter (as indicated at 12) as used in the preceding embodiments. The laser beams Ls and Lp which are transmitted through the non-polarizing beam splitter 14 are incident upon the polarizing beam splitter 26. The laser beam Lp is transmitted through the beam splitter 26. On the other hand, the laser beam Ls is reflected by the beam splitter 26, transmitted through a lens 82, a ¼ waveplate 84 and a focusing lens 85, and incident upon a surface 86 of the subject 30, as a reference laser beam, as indicated in solid line in FIG. 7.

Thus, the same spot on the subject surface 86 is irradiated by the S-type linearly polarized reference beam Ls. If the subject surface 86 is slightly oscillating in the vertical direction as seen in FIG. 7, the frequency fs of the reference laser beam Lsr reflected by the subject surface 86 is changed by an amount of $\Delta f$ due to the Doppler effect. This reflected reference laser beam Lsr is again incident upon the polarizing beam splitter 26, through the focusing lens 85, ¼ waveplate 84 and lens 82. Since the beam Lsr incident upon the beam splitter 26 has been transmitted through the ¼ waveplate 84 two times, the polarization plane of the beam Lsr has been rotated by 90°, with respect to that of the beam Ls which was first reflected from the beam splitter 26 toward the subject 30. Consequently, the polarization plane of the laser beam Lsr is now parallel to the incidence plane of the beam splitter 26, whereby the beam Lsr is transmitted through the beam splitter 26.

The reference laser beam Lsr which has been transmitted through the beam splitter 26 is deflected by the acousto-optical deflector 22, reflected by mirrors 88, 90, again transmitted through the beam splitter 26, and is incident upon the non-polarizing beam splitter 14. The reference laser beam Lsr incident upon the beam splitter 14 is reflected toward the polarizer 36, and is received by the measuring photosensor 38 through the polarizer 36.

The acouto-optical deflector 22 deflects the reference laser beam Lsr reflected by the subject surface 86, such that the frequency of the reflected reference laser beam Lsr is changed by an amount fu. Therefore, the frequency of the reference laser beam Lsr received by the measuring photosensor 38 amounts to $(fs+\Delta f+fu)$.

The measuring laser beam Lp which has been transmitted through the polarizing beam splitter 26 is reflected by the mirrors 90, 88, and incident upon the acousto-optical deflector 22. The measuring laser beam Lp deflected by the acousto-optical deflector 22 is transmitted through the polarizing beam splitter 26, lens 82, ¼ waveplate 84 and focusing lens 85, and is converged on the subject surface 86. More specifically, the measuring laser beam Lp which has been deflected by an angle $\theta$ by the deflector 22 is once converged on the lens 82 such that the point of convergence is offset from the optical axis, by a distance $(F\times\theta)$, where F represents the focal length of the lens 82. The laser beam Lp is converged on the subject surface 86, by the focusing lens 85, which may be a microscope object lens. As in the preceding embodiments, the point of convergence of the measuring laser beam Lp (P-type linearly polarized beam) is moved on the subject surface 86, according to the deflection angle $\theta$ of the beam Lp. Suppose the focusing lens 85 has a magnification M and the beam deflection angle is $\Delta\theta$, the point of convergence of the measuring laser beam Lp is moved by a distance $(M\times F\times\Delta\theta)$, on the subject surface 86. Thus, the spot on the subject surface 86 which is irradiated by the measuring laser beam Lp is moved between the predetermined two points.

If the subject surface 86 is slightly oscillating in the vertical direction for some reason or other, the frequency fp of the measuring laser beam Lpr reflected by the subject surface 86 is changed due to the Doppler effect, by the same amount $\Delta f$ as described above with respect to the reflected reference laser beam Lsr. The reflected measuring laser beam Lpr is reflected by the polarizing beam splitter 26, since the polarization plane of the reflected measuring laser beam Lpr has been changed by 90° by the ¼ waveplate 84, and is perpendicular to the incidence plane of the beam splitter 26. The measuring laser beam Lpr reflected by the beam splitter 26 is reflected by the non-polarizing beam splitter 14, transmitted through the polarizer 36 and received by the measuring photosensor 38. The frequency of the measuring laser beam Lsr incident upon the photosensor 38 is equal to $(fp+\Delta f+fu)$.

The photosensor 38 produces the measuring beat signal BS having the beat frequency fD which is equal to a difference between the frequencies $(fs+\Delta f+fu)$ and $(fp+\Delta f+fu)$ of the reference and measuring laser beams Lsr and Lpr. Since the reference and measuring laser beams Lsr and Lsp are both reflected by the subject surface 86 and once transmitted through the acousto-optical deflector 22, the Doppler shift $\Delta f$ and the frequency shift fu of the two beams Lsr, Lpr are cancelled by each other. Therefore, the measuring beat signal BS does not include noises due to the Dopper shift and frequency shift.

The phase of the measuring beat signal BS is changed as the length of the optical path of the measuring laser beam Lpr is changed due to the roughness of the subject surface 86. An amount of phase shift of the beat signal BS, i.e., the phase difference $\Delta\phi$ between the reference beat signal KBS produced by the reference photosensor 18, and the measuring laser beam Lpr, is expressed by the above-indicated equation (1). Further, the measuring beat frequency fD of the measuring beat signal BS is represented by the above-indicated equation (2), where the phase shift amount $\Delta\phi$ of the beat signal BS is larger than $2\pi$.

The present surface roughness measuring apparatus is also operated with the detecting circuit as shown in FIG. 2, and the roughness of the subject surface 86 is measured in the same manner as described above.

This embodiment offers the same advantage as the embodiment of FIG. 6. That is, the reference laser beam Ls is not incident upon the mirror 34 as used in the embodiments of FIGS. 1, 3 and 5, but is incident upon the subject surface 86. Therefore, the reference and measuring laser beams Ls and Lp are not subject to an influence due to different optical characteristics, or are subject to the same influence due to external conditions such as vibrations, and density and temperature of the surrounding atmospheres.

While the present invention has been described in its presently preferred embodiments, with a certain degree of particularity, it is to be understood that the invention is not limited to the details of the illustrated embodiments, but may be embodied with various changes, modifications and improvements, which may occur to those skilled in the art.

While the acousto-optical deflector 22, 72, 76 used in the illustrated embodiment utilizes an ultrasonic diffraction grating, the acousto-optical deflector may be replaced by an electro-optical deflector whose refractive index changes with an electric field according to the electro-optical effect, a thermo-optical deflector whose refractive index changes with the temperature according to the thermo-optical effect, or other deflectors which operate according to other principles.

While the illustrated embodiments are adapted to measure the roughness of the surface of the subject 30, in general, specific applications of the instant invention include the measurement or testing of data storage surfaces of a data storage medium such as a video disk or a digital audio disk.

In the embodiment of FIG. 7, the ¼ waveplate 84, mirrors 88, 90, etc. are used for partly defining the optical path of the laser beams Ls, Lp, other optical components such as a polarizing beam splitter may be used. Further, the optical paths of the beams defined in the illustrated embodiments may be suitably modified.

It will be understood that other changes, modifications and improvements may be made in the invention, without departing from the spirit and scope of the invention defined in the following claims.

What is claimed is:

1. An optical surface roughness measuring apparatus for measuring the roughness of a surface of a subject in a non-contacting manner, based on a heterodyne interference wherein a phase of a measuring beat beam produced by a reference laser beam, and a measuring laser beam reflected by said surface of the subject and having a wavelength different from that of the reference laser beam is changed as a length of an optical path of said measuring laser beam is changed with a change in the surface roughness of the subject, comprising:

a laser source for producing two laser beams having mutually perpendicular polarization planes and different frequencies, and thereby providing a reference beat beam;

means for separating a first portion of said reference beat beam from the remaining second portion which serves as said reference and measuring laser beams providing said measuring beat beam;

lens device including an object lens for converging said measuring laser beam on said surface of the subject;

a deflector for deflecting said measuring laser beam before said measuring laser beam is incident upon said surface of the subject, thereby moving a point of convergence of said measuring laser beam on said surface of the subject in a direction parallel to said surface, while said subject is held stationary, and a detecting circuit comprising a reference photosensor receiving said first portion of said reference beat beam and producing a reference beat signal, and a measuring photosensor receiving said measuring beat beam and producing a measuring beat signal whose phase is changed with a change in said length of said optical path thereof, said detecting circuit producing an output indicative of said roughness of the surface of the subject, based on a beat signal of the received reference and measuring beat signals.

2. An optical surface roughness measuring apparatus according to claim 1, wherein said deflector comprises an acousto-optical deflector which has a diffraction grating whose refractive index changes with a frequency of a ultrasonic wave to which said diffraction grating is exposed.

3. An optical surface roughness measuring apparatus according to claim 1, further comprising a mirror, and beam splitting means disposed between said laser source and said deflector, said beam splitting means transmitting said measuring laser beam so that the transmitted measuring laser beam is incident upon said deflector and the deflected measuring laser beam is incident upon the surface of the subject, said beam splitting means reflecting said reference laser beam toward said mirror so that the reflected reference laser beam is reflected by said mirror.

4. An optical surface roughness measuring apparatus according to claim 3 which said measuring photosensor is responsive to the reference and measuring laser beams which have been reflected by said mirror and said surface of the subject, respectively, said detecting circuit further comprising means for eliminating a frequency shift of said measuring laser beam by said deflector.

5. An optical surface roughness measuring apparatus according to claim 1, further comprising beam splitting means disposed between said laser source and said deflector, a mirror, and another deflector disposed between said mirror and said beam splitting means, said beam splitting means transmitting said measuring laser beam toward said deflector so that the transmitted measuring laser beam is deflected by said deflector and the deflected measuring laser beam is incident upon the surface of the subject, said beam splitting means reflecting said reference laser beam toward said another deflector so that the reflected reference laser beam is deflected by said another deflector and the deflected reference laser beam is incident upon said mirror.

6. An optical surface roughness measuring apparatus according to claim 1, wherein said deflector is disposed between said laser source and said subject, said deflector deflecting only said measuring laser beam so that the deflected measuring laser beam is incident upon the surface of the subject, said deflector transmitting said reference laser beam for incidence upon the surface of the subject such that a point of convergence of the incident reference laser beam on the surface of the subject is held fixed.

7. An optical surface roughness measuring apparatus for measuring the roughness of a surface of a subject in a non-contacting manner, base don a heterodyne interference wherein a phase of a beat beam produced by a reference laser beam, and a measuring laser beam reflected by said surface of the subject and having a wavelength different from that of the reference laser beam is changed as a length of an optical path of said measuring laser beam is changed with a change in the surface roughness of the subject, comprising:

a laser source for producing said reference and measuring laser beams;

lens device including an object lens for converging said measuring laser beam on said surface of the subject;

a deflector for deflecting said measuring laser beam before said measuring laser beam is incident upon said surface of the subject, thereby moving a point of convergence of said measuring laser beam on said surface of the subject in a direction parallel to said surface, while said subject is held stationary; and beam guiding means including beam splitting means for directing said reference laser beam for incidence upon the surface of the subject, without said reference laser beam passing through said deflector, so that a point of convergence of the incident reference laser beam on the surface of the subject is held fixed, said beam guiding means directing said measuring laser beam such that the measuring laser beam is deflected by said deflector and the deflector measuring laser beam is incident upon the surface of the subject so that said point of convergence of the incident measuring laser beam is moved with the deflection thereof by said deflector.

8. An optical surface roughness measuring apparatus according to claim 7, wherein said beam guiding means further includes reflector means for directing said measuring laser beam from said beam splitting means, for transmission through said deflector means such that the deflected measuring laser beams is incident upon the surface of the subject.

9. An optical surface roughness measuring apparatus according to claim 8, wherein said beam splitting means comprises a beam splitter which reflects said reference laser beam for incidence upon the surface of the subject, and which transmits the reference laser beam reflected from the surface of the subject, for transmission through said deflector, said beam splitter transmitting said measuring laser beam for reflection by said reflector means so that the reflected measuring laser beam is transmitted through said deflector.

10. An optical surface roughness measuring apparatus according to claim 9, further comprising a $\frac{1}{4}$ waveplate disposed between said beam splitter and said subject, for permitting the reference laser beam reflected by said surface of the subject to be transmitted through said beam splitter, for transmission through said deflector, said $\frac{1}{4}$ waveplate permitting said deflected measuring laser beam reflected by said surface to be reflected by said beam splitter so that the reflected measuring laser beam is not transmitted again through said deflector.

11. An optical surface roughness measuring apparatus for measuring the roughness of a surface of a subject in a non-contacting manner, based on a heterodyne interference wherein a phase of a beat beam produced by a reference laser beam, and a measuring laser beam reflected by said surface of the subject and having a wavelength different from from that of the reference laser beam is changed as a length of an optical path of said measuring laser beam is changed with a change in the surface roughness of the subject, comprising:

a laser source for producing said reference and measuring laser beams;

leans device including an object lens for converging said measuring laser beam on said surface of the subject;

a deflector for deflecting said measuring laser beam before said measuring laser beam is incident upon said surface of the subject, thereby moving a point of convergence of said measuring laser beam on said surface of the subject in a direction parallel to said surface, while said subject is held stationary;

a mirror; and beam splitting means disposed between said deflector and said subject, said beam splitting means transmitting said measuring laser beam so that the transmitted measuring laser beam is incident upon the surface of the subject, while reflecting said reference laser beam toward said mirror so that the reflected laser beam is reflected by said mirror.

12. An optical surface roughness measuring apparatus for measuring the roughness of a surface of a subject in a non-contacting manner, based on a heterodyne interference wherein a phase of a beat beam produced by a reference laser beam, and a measuring laser beam reflected by said surface of the subject and having a wavelength different from that of the reference laser beam is changed as a length of an optical path of said measuring laser beam is changed with a change in the surface roughness of the subject, comprising:
- a laser source for producing said reference and measuring laser beams;
- lens device including an object lens for converging said measuring laser beam on said surface of the subject;
- a deflector for deflecting said measuring laser beam before said measuring laser beam is incident upon said surface of the subject, thereby moving a point of convergence of said measuring laser beam on said surface of the subject in a direction parallel to said surface, while said subject is held stationary;
- a mirror;
- beam splitting means disposed between said laser source and said deflector, said beam splitting means transmitting said measuring laser beam so that the transmitted measuring laser beam is incident upon said deflector and the deflected measuring laser beam is incident upon the surface of the subject, said beam splitting means reflecting said reference laser beam toward said mirror so that the reflected reference laser beam is reflected by said mirror; and
- a detecting circuit which comprises a measuring photosensor responsive to said reference and measuring laser beams which have been reflected by said mirror and said surface of the subject, respectively, said detecting circuit further comprising means for eliminating a frequency shift of said measuring laser beam by said deflector.

13. An optical surface roughness measuring apparatus for measuring the roughness of a surface of a subject in a non-contacting manner, base don a heterodyne interference wherein a phase of a beat beam produced by a reference laser beam, and a measuring laser beam reflected by said surface of the subject and having a wavelength different from that of the reference laser beam is changed as a length of an optical path of said measuring laser beam is changed with a change in the surface roughness of the subject, comprising:
- a laser source for producing said reference and measuring laser beams;
- lens device including an object lens for converging said measuring laser beam on said surface of the subject;
- a first deflector for deflecting said measuring laser beam before said measuring laser beam is incident upon said surface of the subject, thereby moving a point of convergence of said measuring laser beam on said surface of the subject in a direction parallel to said surface, while said subject is held stationary;
- a mirror;
- beaming splitting means disposed between said laser source and said first deflector, said beam splitting means transmitting said measuring laser beam so that the transmitted measuring laser beam is deflected by said first deflector and the deflected measuring laser beam is incident upon the surface of the subject, said beam splitting means reflecting said reference laser beam; and
- a second deflector disposed between said mirror and said beam splitting means for deflecting said reference laser beam reflected by said beam splitting means, by an angle equal to an angle by which said measuring laser beam is deflected by said first deflector, said reference laser beam deflected by said second deflector being incident upon said mirror,
- a frequency shift of the measuring laser beam which is caused by deflection thereof, by said first deflector being cancelled by a frequency shift of the reference laser beam which is caused by deflected thereof by said second deflector, when said measuring and reference laser beams respectively reflected by the surface of the subject and said mirror are combined with each other.

14. An optical surface roughness measuring apparatus for measuring the roughness of a surface of a subject in a non-contacting manner, based on a heterodyne interference wherein a phase of a beat beam produced by a reference laser beam, and a measuring laser beam reflected by said surface of the subject and having a wavelength different from that of the reference laser beam is changed as a length of an optical path of said measuring laser beam is changed with a change in the surface roughness of the subject, comprising:
- a laser source for producing two laser beams having mutually perpendicular polarization planes and different frequencies;
- lens device including an object lens for converging one of said two laser beams on said surface of the subject, as said measuring laser beam; and
- a deflector disposed between said laser source and said subject, for deflecting only said one of said two laser beams as said measuring laser beam so that said measuring laser beam deflected by said deflector is incident upon said surface of the subject, whereby a point of convergence of said measuring laser beam on said surface of the subject is moved in a direction parallel to said surface, while said subject is held stationary, said deflector transmitting the other of said two laser beams as said reference laser beam, for incidence upon the surface of the subject such that a point of convergence of the incident reference laser beam on the surface of the subject is held fixed.

* * * * *